US007406699B2

(12) United States Patent
Liu et al.

(10) Patent No.: US 7,406,699 B2
(45) Date of Patent: *Jul. 29, 2008

(54) ENHANCED RUNTIME HOSTING

(75) Inventors: Weiwen Liu, Redmond, WA (US);
Steven J. Pratschner, Redmond, WA (US); Ian H. Carmichael, Sammamish, WA (US); Peter A. Carlin, Seattle, WA (US); Christopher W. Brumme, Mercer Island, WA (US); Mason K. Bendixen, Kirkland, WA (US); Beysim Sezgin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 535 days.

This patent is subject to a terminal disclaimer.

(21) Appl. No.: 10/405,560

(22) Filed: Apr. 2, 2003

(65) Prior Publication Data
US 2004/0199927 A1 Oct. 7, 2004

(51) Int. Cl.
*G06F 3/00* (2006.01)
*G06F 9/46* (2006.01)

(52) U.S. Cl. .................................... 719/328
(58) Field of Classification Search ............... 707/206; 711/170–173; 717/120–121; 718/1, 100, 718/104, 106; 719/311–332
See application file for complete search history.

(56) References Cited

U.S. PATENT DOCUMENTS

| 5,909,580 | A  * | 6/1999 | Crelier et al. ............... 717/141 |
| 6,457,142 | B1 * | 9/2002 | Klemm et al. ................ 714/38 |
| 6,816,956 | B1 * | 11/2004 | Benayon et al. ............. 711/170 |
| 6,915,457 | B1 * | 7/2005 | Miller ......................... 714/43 |
| 6,941,437 | B2 * | 9/2005 | Cook et al. ................. 711/173 |
| 7,007,269 | B2 * | 2/2006 | Sluiman et al. ............. 717/130 |
| 7,086,064 | B1 * | 8/2006 | Stevens ....................... 719/310 |
| 2002/0087618 | A1 | 7/2002 | Bohm et al. |
| 2003/0033443 | A1 * | 2/2003 | Igotti ......................... 709/328 |
| 2003/0093433 | A1 * | 5/2003 | Seaman et al. ............. 707/102 |
| 2003/0167421 | A1 * | 9/2003 | Klemm ....................... 714/37 |
| 2004/0158589 | A1 * | 8/2004 | Liang et al. ................ 707/206 |

OTHER PUBLICATIONS

Engler, Dawson R. et al., "Exokernal: An Operating System Architecture for Application-Level Resource Management", Operating Systems Review, ACM USA, vol. 29, No. 5, Dec. 1995, pp. 251-266.
Haines, Matthew "On Designing Lightweight Threads for Substrate Software", Proceedings of the Usenix 1997 Annual Technical Conference Usexix Assoc Berkeley, CA, USA, 1997, pp. 243-255.

(Continued)

*Primary Examiner*—Meng-Ai An
*Assistant Examiner*—Charles E Anya
(74) *Attorney, Agent, or Firm*—Lee & Hayes, PLLC

(57) ABSTRACT

Systems and methods for enhanced runtime hosting are described. In one respect, the runtime identifies any abstraction interface(s) exposed by a host application. The abstraction interface(s) correspond to respective execution environment functionality implemented by the hosting application. During execution of runtime managed code and responsive to an action or event associated with an identified one of the respective execution environment abstractions, the runtime calls a specific interface or object corresponding to a specific one of the abstraction interface(s). This allows the host application to customize/enhance its execution environment, which includes the runtime, as a function of the implemented abstraction(s).

57 Claims, 6 Drawing Sheets

OTHER PUBLICATIONS

Harris, Timothy L. "An Extensible Virtual Machine Architecture", retrieved from the internet on Jun. 25, 2007 at <<http://citeseer.ist.psu.edu/263243.html>>, Oct. 3, 1999, pp. 1-5.

Harris, Timothy L. "Extensible Virtual Machines", retrieved from the internet on Jun. 27, 2007 at <<http://citeseer.ist.psu.edu/harris01extensible.html>>, Dec. 2001, pp. 1-204.

Kaashoek, M. Frans et al., "Application Performance and Flexibility on Exokernal Systems", Operating Systems Review ACM USA, vol. 31, No. 5, Dec. 1997, pp. 52-65.

Manadhata, Pratyusa et al., "Extensible Operating Systems", retrieved from the internet on Jun. 22, 2007 at <<http://citeseer.comp.nus.edu.sg/porwal01extensible.html>>, Apr. 16, 2001, pp. 1-26.

* cited by examiner

ENHANCED RUNTIME HOSTING

RELATED APPLICATIONS

This application is related to U.S. patent application Ser. No. 09/598,105, titled "METHOD AND SYSTEM FOR COMPILING MULTIPLE LANGUAGES", filed on Jun. 21, 2000 commonly assigned hereto, and hereby incorporated by reference.

TECHNICAL FIELD

The invention pertains to computer software development. More particularly, this invention relates to application program interfaces (APIs) that increase integration of the execution environment between an application and hosted runtime services.

BACKGROUND

In today's complex computer-program and networking environments, code sharing, scalability, and integration with other cross-platform frameworks are generally highly desired. Use of a runtime by a hosting application (i.e., hereinafter often referred to as a "host") generally allows application developers to write managed code with cross-platform compatibility, increased scalability, a common type system, multiple-language support, automatic memory management, and so on. Runtimes include, for example a Common Language Runtime (CLR), a Java Virtual Machine (VM), and/or the like.

Most hosts consist of both managed code and unmanaged code. Managed code is code that executes under the control of a runtime. Conversely, unmanaged code is code that runs outside of the runtime. Common object model (COM) components, ActiveX® interfaces, and WIN32® API functions are examples of unmanaged code. Unmanaged hosting code is used to configure the common language runtime, load it into the process (i.e., an executing program), and transition the program into managed code.

Other than these basic interactions, once a process is running, interaction between the host and the runtime is typically limited to the host directing the runtime to perform some task. In some cases, the host may receive an event or message to signal that a requested runtime task has completed. Such limited host/runtime interaction represents the substantial lack of integration between the host and the runtime during process execution. For these reasons, the host and the runtime can be said to represent substantially separate entities in a process. Such a lack of execution environment integration between a host and a runtime is substantially limiting in that hosting applications have little or no control over many of the services provided by the runtime.

For example, suppose that the host utilizes cooperative or non-preemptive threading, generally requiring the host to at least have knowledge all threads running in the host's execution environment. Suppose also that a runtime relies on the non-cooperative or preemptive threading model of the OS. (Runtimes typically rely on operating system (OS) threading, memory management, synchronization, security, etc., implementations). In this scenario, the host may send a thread into the runtime. At this point, OS preemptive tasking may block the host's non-preemptive thread and/or the host may move the task to a completely different physical thread. To make matters worse, the host thread may exit the runtime into code that does not belong to the host or the runtime, whereupon just about anything could happen to the host thread without of host knowledge. Such non-integrated host/runtime thread management may substantially degrade host runtime performance and scalability, may result in the loss of data coherence, create deadlocks that the host can not detect, and/or otherwise cause unpredictable host and system behavior.

The foregoing example shows that lack of execution environment integration between a host and a runtime may break the host application's expected implementation(s). This is especially the case when the host has tuned threading, memory, synchronization, and/or security implementations over time for improved scalability and high performance. Thus, although the host may desire the benefits of a runtime use (e.g., cross-platform compatibility, reduced coding efforts, etc.), the host's specially tuned implementation may be incompatible with corresponding runtime services. Accordingly, the host may only load a runtime that relies on host-supplied services, or may completely bypass runtime services by directly accessing underlying OS services. Such work-around(s) do not allow application designers to leverage the benefits runtime system services were designed to provide, resulting in less integrated and portable products.

Accordingly, systems and methods to increase execution environment control between a host and a runtime are greatly desired.

SUMMARY

Systems and methods for enhanced runtime hosting are described. In one aspect, the runtime identifies any abstraction interface(s) exposed by a host application. The abstraction interface(s) correspond to respective execution environment functionality implemented by the hosting application. During execution of runtime managed code and responsive to an action or event associated with an identified one of the respective execution environment abstractions, the runtime calls a specific interface or object corresponding to a specific one of the abstraction interface(s). This allows the host application to customize/enhance its execution environment, which includes the runtime, as a function of the implemented abstraction(s).

BRIEF DESCRIPTION OF THE DRAWINGS

The following detailed description is described with reference to the accompanying figures. In the figures, the left-most digit of a component reference number identifies the particular figure in which the component first appears.

DETAILED DESCRIPTION

Overview

Figure 1:
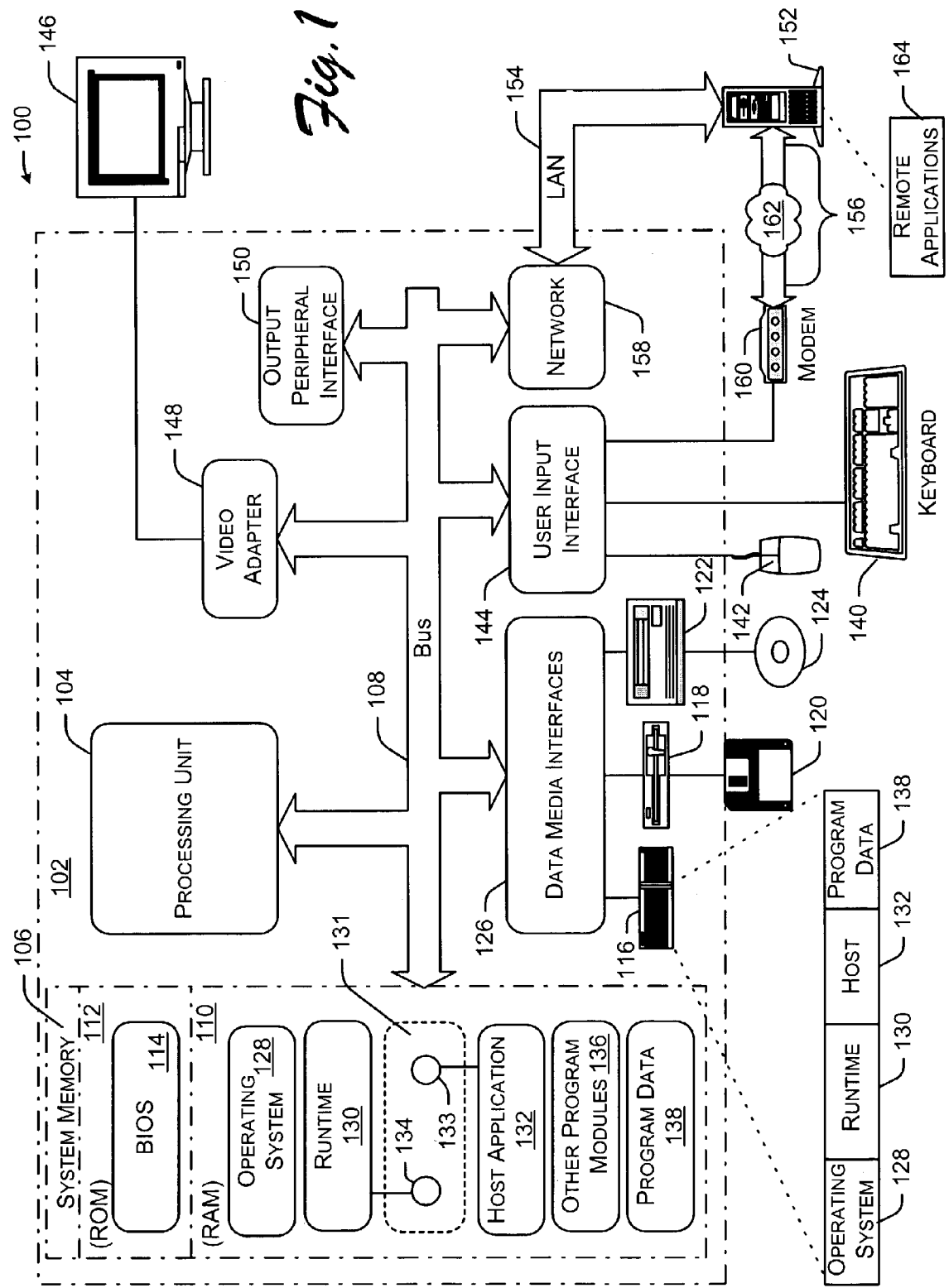
FIG. 1 is a block diagram of an exemplary computing environment within which systems and methods to provide enhanced runtime hosting may be implemented.

Enhanced runtime hosting is described. Conventional integration between an application that hosts a runtime (a hosting application) and the runtime is substantially limited in that the hosting application has very little if any control over a considerable portion of its execution environment. The invention addresses this lack of integration by providing substantially increased execution environment integration between the host and the runtime. This increased integration is implemented with multiple levels of abstracted interfaces that allow a host application to implement and exercise control and customize execution environment functionalities, event notifications, and runtime operations. Such abstractions include, for example, memory management, threading, input/output (I/O) completion, synchronization, event notification (e.g., when threads enter and leave the runtime) service abstractions.

Additionally, runtime interfaces provide the runtime with substantial control over specific aspects of the host application's implementation, including event notification. The runtime's functionality is not dependent on whether a host application has decided to implement such enhanced runtime hosting interfaces.

Exemplary Operating Environment

Turning to the drawings, wherein like reference numerals refer to like elements, the invention is illustrated as being implemented in a suitable computing environment. Although not required, the invention is described in the general context of computer-executable instructions, such as program modules, being executed by a personal computer. Program modules generally include routines, programs, objects, components, data structures, etc., that perform particular tasks or implement particular abstract data types.

FIG. 1 illustrates an example of a suitable computing environment 100 on which the subsequently described systems, apparatuses and methods for enhanced runtime hosting may be implemented (either fully or partially). Exemplary computing environment 100 is only one example of a suitable computing environment and is not intended to suggest any limitation as to the scope of use or functionality of systems and methods the described herein. Neither should computing environment 100 be interpreted as having any dependency or requirement relating to any one or combination of components illustrated in computing environment 100.

The methods and systems described herein are operational with numerous other general purpose or special purpose computing system environments or configurations. Examples of well known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as cellular phones, personal digital assistants, handheld computers, or other communication/computing devices. The invention may also be practiced in distributed computing environments where tasks are performed by remote processing devices that are linked through a communications network. In a distributed computing environment, program modules may be located in both local and remote memory storage devices.

As shown in FIG. 1, computing environment 100 includes a general-purpose computing device in the form of a computer 102. The components of computer 102 can include, by are not limited to, one or more processors or processing units 104, a system memory 106, and a bus 108 that couples various system components including system memory 106 to processor 104.

The system bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 102 typically includes a variety of computer readable media. Such media may be any available media that is accessible by computer 102, and it includes both volatile and non-volatile media, removable and non-removable media. In FIG. 1, system memory 106 includes computer readable media in the form of volatile memory, such as random access memory (RAM) 110, and/or non-volatile memory, such as read only memory (ROM) 112. A basic input/output system (BIOS) 114, containing the basic routines that help to transfer information between elements within computer 102, such as during start-up, is stored in ROM 112. RAM 110 typically contains data and/or program modules that are immediately accessible to and/or presently being operated on by processor 104.

Computer 102 may further include other removable/non-removable, volatile/non-volatile computer storage media. For example, FIG. 1 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM/R/RW, DVD-ROM/R/RW/+R/RAM or other optical media. Hard disk drive 116, magnetic disk drive 118 and optical disk drive 122 are each connected to bus 108 by one or more interfaces 126.

The drives and associated computer-readable media provide nonvolatile storage of computer readable instructions, data structures, program modules, and other data for computer 102. Although the exemplary environment described herein employs a hard disk, a removable magnetic disk 120 and a removable optical disk 124, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A user may provide commands and information into computer 102 through input devices such as keyboard 140 and pointing device 142 (such as a "mouse"). Other input devices (not shown) may include a microphone, joystick, game pad, satellite dish, serial port, scanner, camera, etc. These and other input devices are connected to the processing unit 104 through a user input interface 144 that is coupled to bus 108, but may be connected by other interface and bus structures, such as a parallel port, game port, or a universal serial bus (USB).

A monitor 146 or other type of display device is also connected to bus 108 via an interface, such as a video adapter 148. In addition to monitor 146, personal computers typically include other peripheral output devices (not shown), such as speakers and printers, which may be connected through output peripheral interface 150.

Computer 102 may operate in a networked environment using logical connections to one or more remote computers, such as a remote computer 152. Remote computer 152 may include many or all of the elements and features described herein relative to computer 102. Logical connections shown in FIG. 1 are a local area network (LAN) 154 and a general wide area network (WAN) 156. Such networking environments are commonplace in offices, enterprise-wide computer networks, intranets, and the Internet.

When used in a LAN networking environment, computer 102 is connected to LAN 154 via network interface or adapter 158. When used in a WAN networking environment, the computer typically includes a modem 160 or other means for establishing communications over WAN 156. Modem 160, which may be internal or external, may be connected to system bus 108 via the user input interface 144 or other appropriate mechanism.

Depicted in FIG. 1, is a specific implementation of a WAN via the Internet. Here, computer 102 employs modem 160 to establish communications with at least one remote computer 152 via the Internet 162.

In a networked environment, program modules depicted relative to computer 102, or portions thereof, may be stored in a remote memory storage device. Thus, e.g., as depicted in FIG. 1, remote application programs 164 may reside on a memory device of remote computer 152. It will be appreciated that the network connections shown and described are exemplary and other means of establishing a communications link between the computers may be used.

A number of program modules may be stored on the hard disk, magnetic disk 120, optical disk 124, ROM 112, or RAM 110, including, e.g., an operating system (OS) 128, a runtime 130, a host application 132 (hereinafter often referred to as "host" 132), other program modules 136, and program data 138. The OS provides conventional functions, such as file management, event handling, processes and threads, memory management, user interfaces (e.g., windowing, menus, dialogs, etc.), security, authentication, verification, and/or the like.

The runtime 130 and the host application 132 expose enhanced runtime hosting abstraction interfaces 131 for application developers to customize and tightly integrate process execution between the hosting application and the runtime. For purposes of this discussion, an "abstraction" is a function/method that is optionally implemented by the application developer in the host application. The host-implemented function is abstract, because it will essentially replace a thread of execution that the runtime would have followed had the host not implemented the function. In line with this, APIs exposed by the host 132 for the runtime to redirect services to host-implemented functionality and/or exposed by the runtime 130 for the host to notify the runtime of host action are called "abstracted" or "abstraction interfaces" (i.e., abstraction interfaces 131).

Abstraction interfaces 131 (hereinafter often referred to as "runtime hosting interefaces" (RHIs) 131) implemented by the host are referred to as host abstraction interfaces (HAIs) 133. HAIs are mapped to any combination of memory, threading, I/O completion, synchronization, and/or other service functionalities provided by the host. The RHIs 131 substantially extend the functionality of these conventional interfaces between runtimes and hosts by allowing host application(s) to customize and control many more aspects of the runtime 130 than possible in existing implementations. This provides substantially tighter execution environment integration between the runtime 130 and host 132 execution models as compared to conventional host/runtime execution environment integration, which is considerably limited and problematic.

Cooperative exchange of the HAIs 133 between the runtime 130 and the host application 132 allow the respective entities to negotiate which functions are to be performed by the host, and which functions are to be abstracted such that they are carried out by the runtime. As such the host application can customize its execution environment. Exposed HAIs further allow the runtime to configure certain host execution environment parameters, and notify the host (e.g., via supplied callbacks) of particular runtime events (e.g., resource allocation failures, thread state, etc.).

The runtime 130 exposes runtime interfaces (RIs) 134 for use by the host application 132 to configure runtime operations, notify the runtime of certain events, to obtain additional information during process execution, and so on. During process execution, host application calls to the RI are: redirected back to the host application via one or more HAIs 133 for host specific implementation of a specific service, handed to the operating system 128 for execution, handled locally by the runtime, and/or communicated to object model services (i.e., "other program modules" 136).

Memory Abstraction Interfaces

A memory management portion of the runtime hosting interfaces (RHIs) 131:

Allow the host 132 to provide an interface (i.e., one of the exposed host application interfaces (HAIs) 133) through which the runtime 130 will request all memory allocations. In one implementation, the host interface 133 provides methods that replace both OS memory API's and standard C runtime allocation routines.

Provide a mechanism for the host 132 to abstract the low memory notification the runtime 130 currently gets from the OS. This provides the host with a mechanism to ask the runtime 130 to make additional memory available, for example, via garbage collection services.

Allow the runtime 130 to inform the host 132 of the consequences of failing a particular allocation, and further allow the host to customize the action the runtime should take if an allocation must be failed. For example, should the runtime unload an application domain or let it run in a "crippled" state.

The following scenario provides an exemplary use of the memory portion of the RHI 131. Suppose host 132 operates within a configurable amount of memory 110 (e.g., some or nearly all of the physical memory on the computing device 102). To maximize performance, the host tracks all memory allocations and insures that paging never occurs (the host of this example would rather fail a memory allocation than page to disk 116). To accurately track all allocations, the host directs the runtime 130 to call an exposed host abstraction interface (HAI) 133 to allocate memory. This gives to the host the ability to fail the runtime's memory allocations before paging occurs.

Threading Abstraction Interfaces

This section details the thread management portion of the RHI 131. These thread management hosting API's abstract the notion of an OS thread and essentially let the unit of scheduling and execution be defined by the host 132. This supports hosts that implement their own fiber-based scheduling mechanism. The term "task" is often used to define this abstraction and used to decouple the word "thread" from a particular host application's unit of execution and scheduling. In view of this, the thread management APIs:

- Allow the host 132 to provide an interface 133 that the runtime 130 will use to create and start new tasks (threads).
- Provide the host 132 with a mechanism to "reuse" or pool, a runtime-implemented portion of a task. This allows for performance optimization that can be used by a host application to minimize host-implemented task creation and setup operations.
- Implement a callback to notify the runtime 130 when a task has been moved to or from a runnable state. When a call is moved from a runnable state, the host API 133 allows the runtime 130 to specify that the task should be rescheduled by the host 132 as soon as possible.
- Provide a way for the runtime 130 to notify the host 132 that a given task cannot be moved to a different physical OS thread and cannot have its execution blocked during a specified window of time.
- Allow the host 132 to provide an implementation of the thread pool, providing the runtime 130 with the ability to queue work items, set and query the size of the thread pool, and so on.
- Provide notifications on both the host 132 and runtime 130 side that the "locale" has been changed on a given task. A locale is related to localization of software. The runtime 130 includes a notion of current locale, and most hosts applications 132 do as well. These notification interfaces allow the runtime 130 and the host 132 to tell each other if the locale has been programmatically changed on either side—so both sides are kept in sync. For example, if the locale is changed on the runtime side, that may affect sorting order in a database implemented by the host 132.
- Allow the runtime 130 to delay host 132 abort of a given task.
- Provides means for the runtime 130 (and user code) to adjust the priority of a task.

The following scenario provides an exemplary use of the thread management portion of the RHI 131. Suppose that a particular host application 132 implements "fiber mode" execution. In fiber mode, a particular host (e.g., an SQL server) may create some number of threads based on the number of processors 104 on the computing device 102, or based on other host-specific criteria. The host then creates fibers on those threads on which to run user code (a portion of "other program modules" 136). The host schedules these fibers in a cooperative fashion (called non-preemptive in host terminology)—when a fiber blocks for some operation, it gets "switched out" and the thread runs another fiber. Later the fiber will get rescheduled and run-not necessarily on the same thread. When the runtime 130 creates a "task" through the hosting API 134, it ends up as a fiber in the host 132 and is natively understood by the host's scheduler.

I/O Completion Abstraction Interfaces

This section details the I/O completion management portion of the RHI 131, wherein:

- The host 132 provides an HAI 133 for the runtime 130 to bind a handle to an I/O completion port.
- The host 132 provides an HAI 133 for the runtime 130 to supply a callback. The callback, for example, to be invoked by the host 132 when an asynchronous I/O operation completes.
- The runtime 130 provides an RI 134 for the host 132 to insert custom data at the end of the OVERLAPPED structure passed to runtime service I/O routines. An OVERLAPPED structure provides data-like file pointer position.

Synchronization

If the runtime 130 creates one or more tasks through HAIs 133 (i.e., via direction of the host application 132), the runtime will also create the synchronization objects for those task(s) through corresponding HAIs as well. This ensures that locks are not taken on an OS thread without the host's knowledge. This allows runtime 130 tasks to further integrate with the hosts thread scheduling mechanism and to allow the host to perform deadlock detection. To this end, the synchronization management portion of the RHI 131 allows the runtime 130 to create the following synchronization ("sync") primitives through the HAIs 133: critical sections, events (manual and auto-reset), semaphores, reader/writer locks, and monitors.

Abstraction Interfaces for Entering and Leaving the Runtime

Threads running managed code can leave the runtime 130 to run unmanaged code. Locks taken on threads that leave the runtime 130 to run unmanaged code won't go through the RHI 131 so they can't be integrated with the threading and synchronization models of the host application 132. As such, the runtime notifies the host application via a host-implemented callback (the callback being provided by the host to the runtime through a corresponding RI 134) when a thread is entering or leaving the runtime 130 respectively to/from unmanaged code. In view if this, the runtime:

- Notifies the host 132 when a thread transitions into and out of the runtime 130. Such notifications are implemented by hooking calls out-of and into the runtime regardless of whether code has been compiled in a Just-In-Time (JIT) compiling scenario or in a native image compilation scenario (e.g., ngen). In one implementation, the notification includes the address of the routine being called.
- Allows the host 132 to specify that a particular function call to unmanaged code and corresponding runtime re-entry is not to be hooked by the runtime 130 for such notification. Such host specification allows the runtime to implement the particular call in an optimized manner (e.g., implementing the call inline). Hosts can use this interface to bypass the hook for calls they "know about" (i.e., calls that are either a part of the implementation of the host itself or of tightly integrated functionality).

For example, such a host-implemented callback allows the runtime 130 to send the host 132 a "notification" (a call to the hook) that tells the host that a particular thread's behavior can no longer be predicted since it has exited the runtime 130 into user code. Responsive to such a notification, the host 132 may take proactive steps to ensure that the particular thread is not scheduled by the host 132 to participate in any non-preemptive scheduling activity particular to the host's specific implementation, until the thread returns to the runtime.

In one implementation, such a hook can be used by the host 132 to adjust the floating point state of a processor 104. The host 132 may also utilize the RI 134 to indicate that one or more particular function calls are not to be hooked by the runtime 130, for example, to avoid runtime notifications when the host calls a data access API.

An Exemplary Procedure for Enhanced Runtime Hosting

Figure 2:
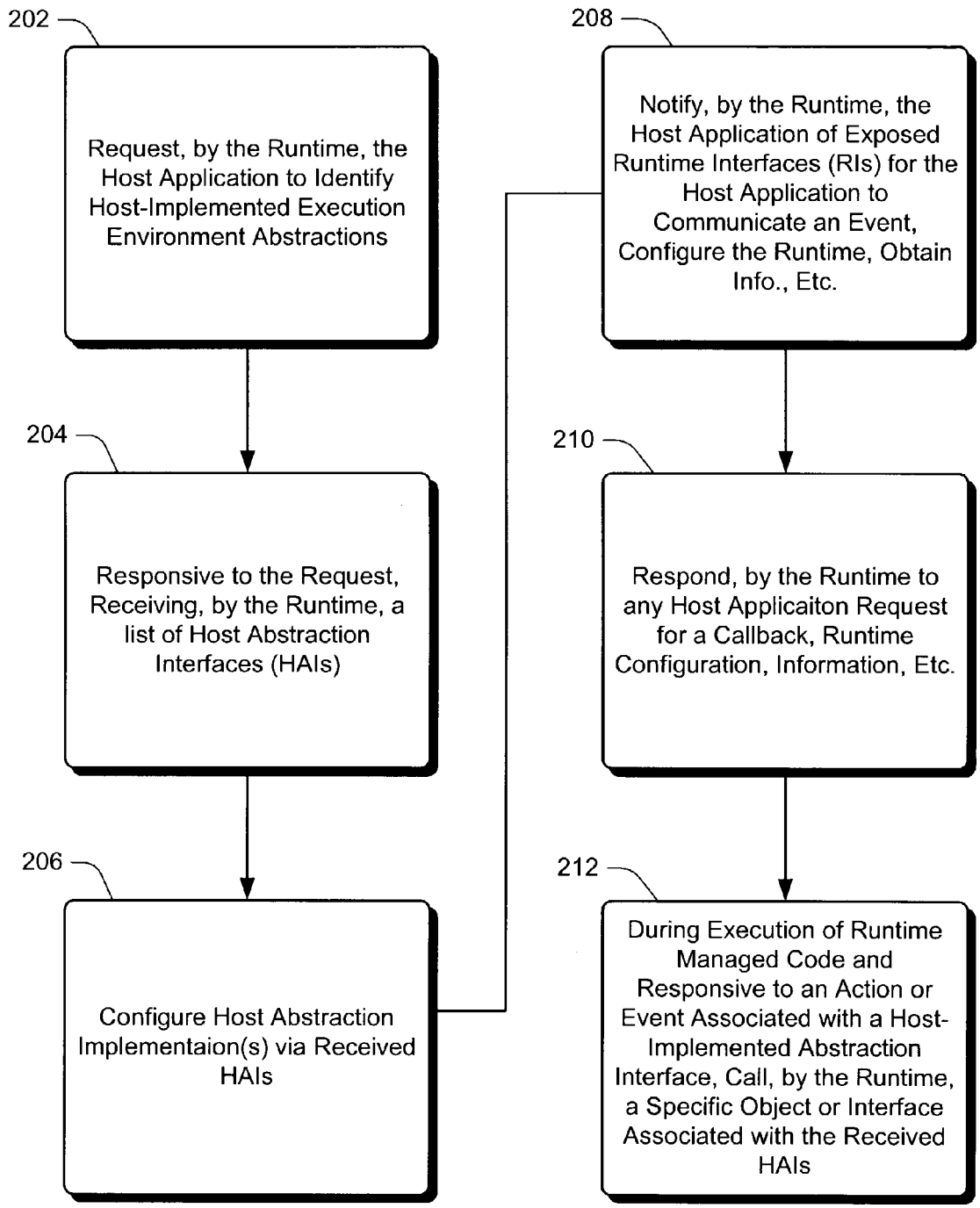
FIG. 2 shows an exemplary procedure to provide enhanced runtime hosting.

FIG. 2 shows an exemplary procedure for enhanced runtime hosting. For purposes of discussion, the operations of FIG. 2 are discussed in reference to features of FIG. 1. Although FIG. 2 shows operations 204-212 in a particular numerical order, these respective operations could logically occur in any order as a function of host application 132 and runtime 130 interaction, characteristics of the execution environment, and so on.

At block 202, after the host application 132 (FIG. 1) has loaded the runtime 130 (FIG. 1) into a process (i.e., startup time), the runtime 130 determines any host-implemented execution environment abstractions (i.e., host supported abstractions). For purposes of discussion, the process is represented by the respective host 132 and runtime 130 components in RAM 110 (FIG. 1). (Whether or not a particular abstraction is supported by the host is not central to how the runtime executes). In one implementation, this operation is accomplished with a request/call by the runtime to an exposed HAI 133 with a list indicating execution environment abstractions of interest. Such a request is represented as a portion of "program data" 138 of FIG. 1. Responsive to this request/call, the host provides the runtime 130 with one or more abstraction-specific interfaces (respective APIs in the HAIs 133) through which to access host-implemented execution environment abstractions (e.g., memory, thread, synchronization, I/O completion, policy, and/or other implemented abstractions).

At block 204, responsive to the runtime request for information regarding which, if any, execution environment abstractions are implemented/supported by the host application 132, the runtime 130 receives a list of HAIs 133 that correspond to abstracted functionality. Such HAIs may reference objects and/or interfaces. At block 206, the runtime may configure abstracted functionality implementation(s) via one or more of the received HAIs.

At block 208, the runtime 130 notifies the host application 132 of one or more runtime interfaces 134 (RIs) exposed by the runtime. In this implementation, such a notification is responsive to a request sent to the runtime 130 by the host application 132. Such a notification and request are represented as respective portions of "program data" 138 of FIG. 1. Such RIs allow the host to notify the runtime of certain events and/or to obtain additional information during process execution. In one implementation, the RI is a callback utilized by the host to notify the runtime of certain events or to obtain additional information during process execution. At block 210, the runtime responds to any host application configuration requests, request for a callback, runtime data, and/or the like.

At block 212, during execution of managed code and responsive to one or more actions or events associated with host-application abstracted functionality, the runtime calls at least one specific interface or object corresponding to a specific one of the returned HAIs. Such actions and events correspond, for example, to management services for memory, threads/tasks, I/O completion, synchronization, event notification(s), garbage collection (GC), and/or the like.

Exemplary Architectural Between Runtime and Host Memory Abstraction

Figure 3:
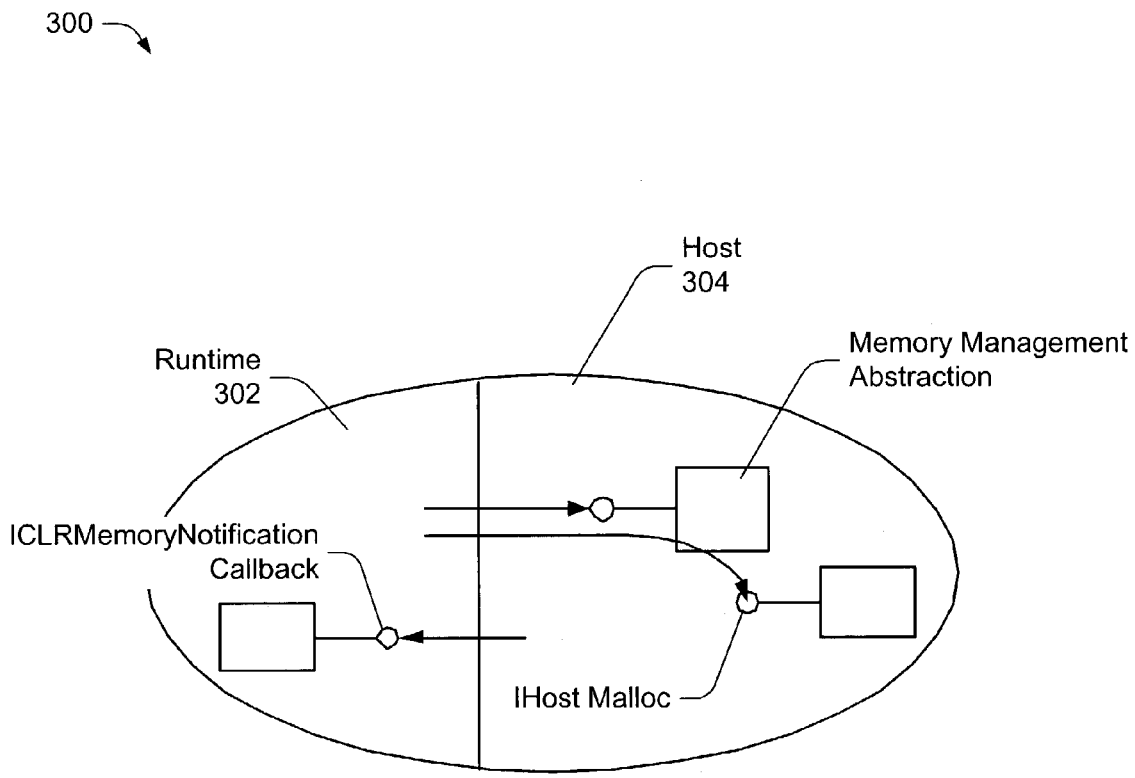
FIG. 3 shows an exemplary architectural relationship between runtime and hosting application memory abstraction interfaces. For purposes of this discussion, an "abstraction" is a function/method that is optionally implemented by the application developer in the host application. The host-implemented function is abstract, because it will essentially replace a thread of execution that the runtime would have followed had the host not implemented the function. In line with this, an application program interface used to access the host-implemented function is called an "abstracted" or "abstraction interface".

FIG. 3 shows an exemplary architectural relationship between runtirne 302 and hosting application memory abstraction interfaces. A memory management abstraction of the runtime hosting interfaces allow the host 304 to provide an interface (i.e., one of the exposed host application interfaces (HAIs) 133) through which the runtime 302 will request all memory allocations. In one implementation, the host interface 133 provides methods that replace both OS memory API's and standard C runtime allocation routines.

The memory management abstraction of the runtime hosting interfaces may provide a mechanism for the host 304 to abstract the low memory notification the runtime 302 currently gets from the operating system. This provides the host 304 with a mechanism to ask the runtime 302 to make additional memory available, for example, via garbage collection services.

The memory management abstraction of the runtime hosting interfaces allow the runtime 302 to inform the host 304 of the consequences of failing a particular allocation, and further allow the host 304 to customize the action the runtime 302 should take if an allocation must be failed. For example, should the runtime 302 unload an application domain or let it run in a "crippled" state.

Exemplary Architectural Relationship Between Runtime and Host Interfaces

Figure 4:
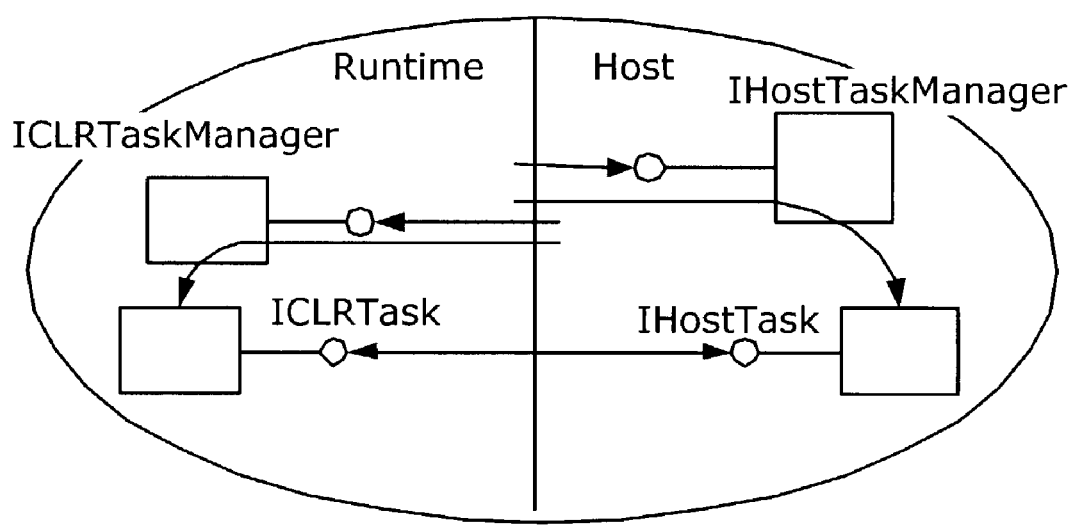
FIG. 4 shows an exemplary architectural relationship between runtime and hosting application thread abstraction interfaces.

FIG. 4 shows an exemplary architectural relationship between runtime and host application thread abstraction interfaces. The four interfaces shown are IRuntime Task Manager, IHost Task Manager, ICLR (Common Language Runtime) Task, and IHost Task. At startup time, the runtime 302 determines which abstractions the host implements, IRuntime Task Manager or IHost task Manager. The thread management APIs may allow the host to provide an interface that the runtime 302 may use to create and start new tasks (threads) and may provide the IHost task Manager with a mechanism to "reuse" or pool, a runtime implemented portion of a task. This allows for performance optimization that may be used by a host application to minimize host-implemented task creation and setup operations.

The thread management APIs may implement a callback to notify the IRuntime Task Manager, when a task has been moved to or from a runnable state. When a call is moved from a runnable state, the host API allows the runtime to specify that the task should be rescheduled by the host as soon as possible. Furthermore, the thread management API may provide a way for the IRuntime Task Manager to notify the host that a given task cannot be moved to a different physical operating system thread and cannot have its execution blocked during a specified window of time.

Abstraction Interfaces for Entering and Leaving the Runtime

Figure 5:
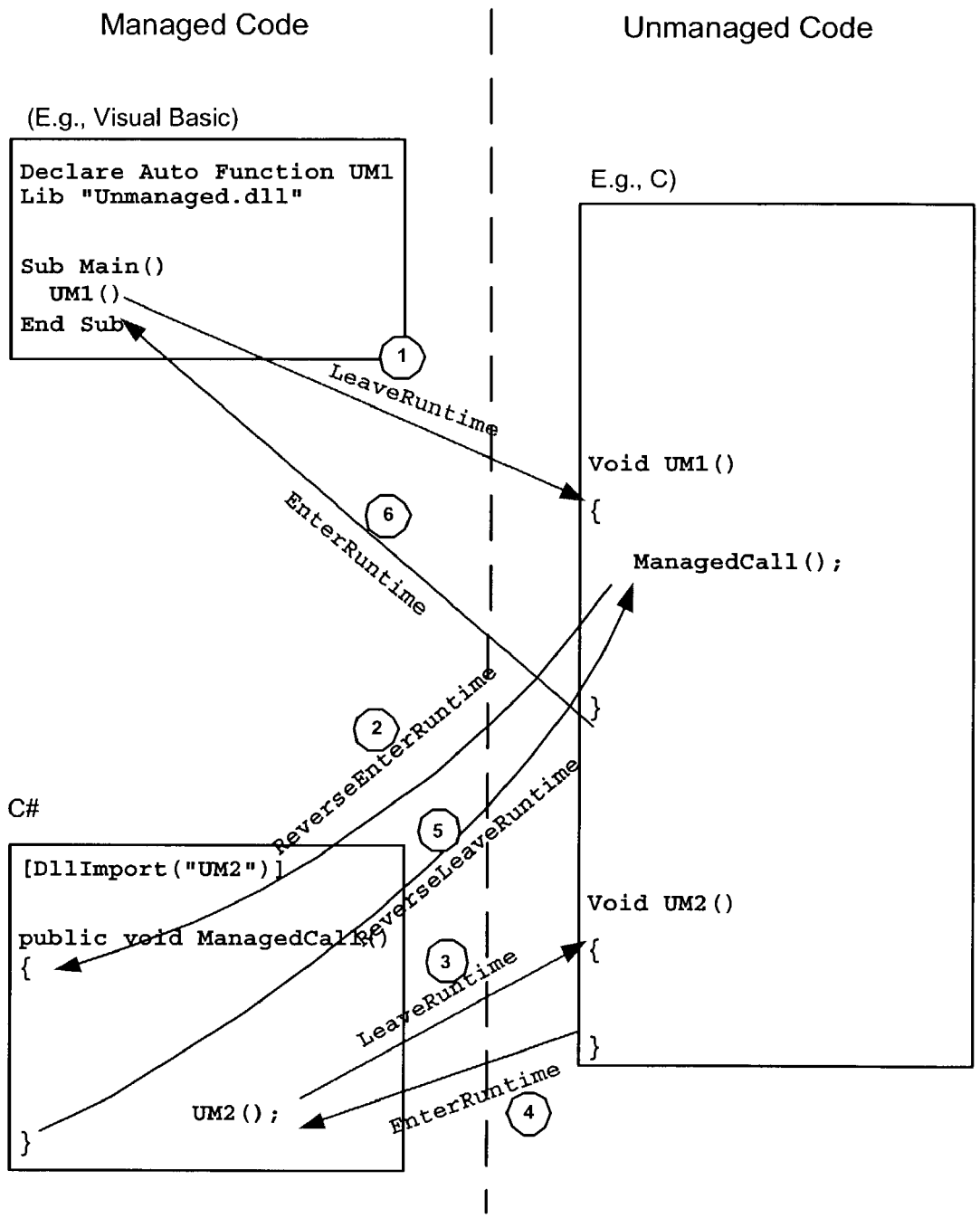
FIG. 5 shows exemplary managed/unmanaged code call sequences for exiting/reverse-exiting and entering/reverse-entering managed code from/to unmanaged code to/from unmanaged code.

FIG. 5 shows exemplary managed/unmanaged code call sequences for exiting (leaving)/reverse-exiting and entering/reverse-entering managed code from/to unmanaged code to/from unmanaged code. Threads running managed code may leave the runtime 130 to run unmanaged code. Locks taken on threads that leave the runtime 130 to run unmanaged code will not go through the RHI 131 so they may not be integrated with the threading and synchronization models of the host application 132. As such, the runtime 130 notifies the host application 132 via a host-implemented callback (the callback being provided by the host to the runtime through a corresponding RI 134) when a thread is entering or leaving the runtime 130 respectively to/from unmanaged code. In view of this, the runtime:

Notifies the host 132 when a thread transitions into and out of the runtime 130. Such notifications are implemented by hooking calls out-of and into the runtime regardless of whether code has been compiled in a Just-In-Time (JIT) compiling scenario or in a native image compilation scenario (e.g., ngen). In one implementation, the notification includes the address of the routine being called.

Allows the host 132 to specify that a particular function call to unmanaged code and corresponding runtime re-entry is not to be hooked by the runtime 130 for such notification. Such host specification allows the runtime to implement the particular call in an optimized manner (e.g., implementing the call inline). Hosts can use this interface to bypass the hook for calls they "know about" (i.e., calls that are either a part of the implementation of the host itself or of tightly integrated functionality).

For example, such a host-implemented callback allows the runtime 130 to send the host 132 a "notification" (a call to the hook) that tells the host that a particular thread's behavior can no longer be predicted since it has exited the runtime 130 into user code. Responsive to such a notification, the host 132 may take proactive steps to ensure that the particular thread is not scheduled by the host 132 to participate in any non-preemptive scheduling activity particular to the host's specific implementation, until the thread returns to the runtime.

In one implementation, such a hook may be used by the host 132 to adjust the floating point state of a processor 104. The host 132 may also utilize the RI 134 to indicate that one or more particular function calls are not to be hooked by the runtime 130, for example, to avoid runtime notifications when the host calls a data access API.

Runtime Tasks Treated as Fibers

Figure 6:
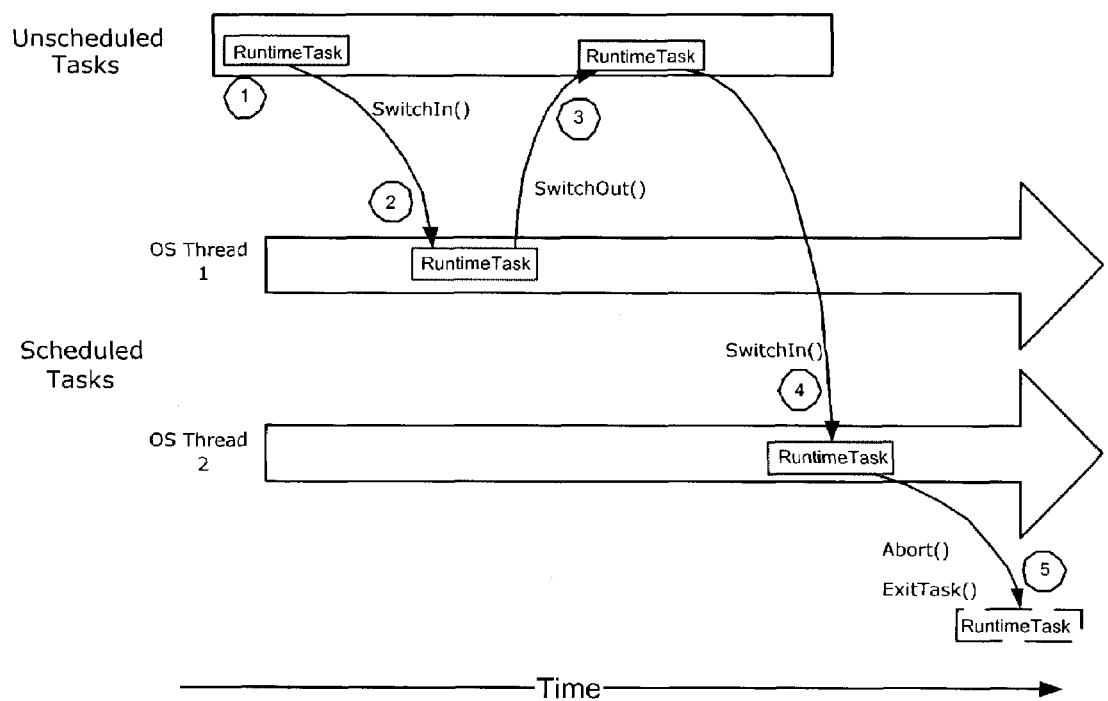
FIG. 6 is a block diagram showing exemplary task scheduling of runtime tasks that are treated as fibers scheduled on OS threads by a host application.

FIG. 6 is a block diagram showing exemplary task scheduling of runtime tasks that are treated as fibers scheduled on operating system threads by a host application. The term "task" is often used to define this abstraction and used to decouple the word "thread" from a particular host application's unit of execution and scheduling.

A thread management API may allow the host to provide an interface that the runtime may use to create and start new tasks, shown as OS Thread 1 and an OS Thread 2. The thread management API may provide the host with a mechanism to "reuse" or pool, a runtime implemented portion of a task. This allows for performance optimization that may be used by a host application to minimize host-implemented task creation and setup operations.

By way of illustration, a host application implements a "fiber mode" execution. In fiber mode, a particular host (e.g., an SQL server) may create some number of threads based on the number of processors on the computing device, or based on other host-specific criteria. The host then creates fibers on those threads on which to run user code (a portion of "other program modules"). The host schedules these fibers in a cooperative fashion (called non-preemptive in host terminology)—when a fiber blocks for some operation, it gets "switched out" and the thread runs another fiber. Later the fiber will get rescheduled and run—not necessarily on the same thread. When the runtime creates a "task" through the hosting API, it ends up as a fiber in the host and is natively understood by the host's scheduler.

For example, FIG. 6 shows how the fibers may operate as "SwitchIn" and how the fibers may block for some operation, shown as "SwitchOut". In these instances, the OS Thread1 or OS Thread2 may run another fiber once the fiber becomes blocked, shown as SwitchOut.

The thread management APIs may allow the host to provide an implementation of the thread pool, providing the runtime with the ability to queue work items, set and query the size of the thread pool, or other types of queuing. In addition, the thread management APIs may provide notifications to the runtime and to the host that a "locale" has been changed on a given task. The locale is related to localization of software. The runtime includes a notion of current locale, and most hosts applications do as well. These notification interfaces allow the runtime and the host to tell each other if the locale has been programmatically changed on either side so both sides are kept in sync.

For example, if the locale is changed on the runtime side, that may affect sorting order in a database implemented by the host. In addition, the thread management APIs may allow the runtime to delay host abort of a given task and may provide means for the runtime (and user code) to adjust the priority of a task.

Conclusion

The described systems and methods provide enhanced runtime hosting. Although the systems and methods have been described in language specific to structural features and methodological operations, the subject matter as defined in the appended claims are not necessarily limited to the specific features or operations described. Rather, the specific features and operations are disclosed as exemplary forms of implementing the claimed subject matter.

The invention claimed is:

1. A method for enhanced runtime hosting, the method comprising:

extending a functionality of conventional interfaces between runtimes and host applications by allowing a host application to customize and to control many aspects of a runtime;

implementing the runtime as a common language runtime (CLR) at the host application, wherein the host application supplies at least one of threading, memory, or synchronization support used by the CLR;

exposing a runtime hosting interface to abstract, customize, and integrate process execution between the host application and the CLR;

identifying one or more host abstraction interfaces (HAIs) exposed by the host application, the one or more HAIs corresponding to respective execution environment abstraction(s) supported by the host application;

during execution of runtime managed code and responsive to an action or event associated with an identified one of the respective execution environment abstractions, calling by the CLR, at least one interface or object corresponding to a specific one of the one or more HAIs;

wherein the operations of identifying and calling provide the host application customizable runtime hosting environment to the host application;

wherein one or more execution environment abstractions correspond to at least one of management services for memory, threads/tasks, input output (I/O) completion, synchronization, runtime entry/exit notification, or garbage collection (GC); and wherein calling further comprises:

allocating memory, by the CLR via at least one specific interface or object implemented by the host application;

notifying the CLR when a task has been moved to or from a runnable state;

obtaining additional information during process execution; and receiving a list of host abstraction interfaces that correspond to abstracted functionality.

2. The method as recited in claim 1, wherein calling further comprises requesting, by the CLR, a memory allocation through the at least one specific interface or object implemented by the host application.

3. The method as recited in claim 1, wherein calling further comprises:

communicating, by the CLR, a low memory notification from the operating system (OS) to the host application via the at least one specific interface or object; or informing, by the CLR, the host application of consequences of failing a particular memory allocation via the at least one specific interface or object, and thereby allowing the host application to customize an action the CLR should take if a memory allocation must be failed.

4. The method as recited in claim 1, wherein calling further comprises creating, by the CLR, a new thread/task via the at least one specific interface or object implemented by the host application.

5. The method as recited in claim 1, wherein calling further comprises reusing or pooling, by the CLR, a runtime-implemented portion of a task via the at least one specific interface or object implemented by the host application.

6. The method as recited in claim 1, wherein calling further comprises notifying the host application, by the CLR via the at least one specific interface or object or pooling, that a task cannot be moved to a different physical operating system (OS) thread and cannot have execution of the task blocked for a specified window of time.

7. The method as recited in claim 1, wherein calling further comprises:

indicating, by the CLR via the at least one specific object or interface, a callback to the host application for notifying the CLR when a task has been moved to a runnable or non-runnable state; and if the task has been moved to a non-runnable state, specifying by the CLR via the at least one specific interface or object that the task is to be rescheduled as soon as possible by the host application.

8. The method as recited in claim 1, wherein calling further comprises:

providing a callback to the host application for notifying the CLR that a task has been moved to a different locale or a locale has changed for the task; or notifying, by the CLR via the at least one specific interface or object, the host application, that a task has been moved to a different locale or a locale has changed for the task.

9. The method as recited in claim 1, wherein calling further comprises delaying, by the CLR, host application abort of a task via the at least one specific interface or object.

10. The method as recited in claim 1, wherein calling further comprises adjusting, by the CLR via the at least one specific interface or object, priority of a task.

11. The method as recited in claim 1, wherein calling further comprises notifying the host application by the CLR via the at least one specific interface or object that a task/thread is to leave the CLR into umnanaged code.

12. The method as recited in claim 1, wherein calling further comprises notifying the host application by the CLR via the at least one specific interface or object that a task/thread is to reverse-leave the CLR into unmanaged code.

13. The method as recited in claim 1, wherein calling further comprises notifying the host application by the CLR via the at least one specific interface or object that a task/thread is to enter the CLR from unmanaged code.

14. The method as recited in claim 1, wherein calling further comprises notifying the host application by the CLR via the at least one specific interface or object that a task/thread is to reverse-enter the CLR from unmanaged code.

15. The method as recited in claim 1 wherein calling further comprises specifying by the CLR via the at least one specific interface or object a maximum number of threads/tasks that will be available to service requests on one or more I/O completion ports.

16. The method as recited in claim 1, wherein calling further comprises binding, by the CLR via the at least one specific interface or object, a handle to an I/O completion port or the host application.

17. The method as recited in claim 1, wherein calling further comprises supplying a runtime implemented callback to the host application, the runtime implemented callback to be invoked by the host application when an asynchronous I/O operation completes.

18. The method as recited in claim 1, wherein calling further comprises:

supplying a runtime implemented callback to the host application, the runtime implemented callback to be invoked by the host application when an asynchronous I/O operation completes; and wherein supplying allows the host application to insert custom data at the end of a structure passed by the host application to the runtime implemented callback, the custom data providing state information.

19. The method as recited in claim 1:

wherein calling further comprises generating a task via the at least one specific interface or object; and wherein the method further comprises creating, by the CLR via the at least one specific object or interface, one or more synchronization objects for the task to substantially ensure host application knowledge of a lock on the task, the one or more synchronization objects comprising a critical section, a manual or auto-reset event, a semaphore, a reader/writer lock, or a task monitor.

20. The method as recited in claim 1, further comprising notifying the host application, by the CLR, of one or more runtime interfaces exposed by the CLR, the runtime interfaces allowing the host to notify the CLR of certain events and/or to obtain additional information at during process execution.

21. A computer-readable storage medium for enhanced runtime hosting, the computer-readable storage medium comprising computer-program executable instructions executable by a processor for:

extending a functionality of conventional interfaces between runtimes and host applications by allowing a host application to customize and to control many aspects aspects of a runtime;

implementing the runtime as a common language runtime (CLR) at the host application, wherein the host application supplies at least one of threading, memory, or synchronization support used by the CLR;

requesting, by a the CLR, a host application to identify any execution environment abstraction(s) supported by the host application;

responsive to the requesting, receiving one or more host abstraction interfaces (HAIs);

during execution of runtime managed code, calling by the CLR, at least one specific interface or object corresponding to a specific one of the one or more HAIs;

identifying and calling operations that provide the host application customizable runtime hosting environment to the host application;

corresponding to at least one of management services for memory, threads/tasks, input output (I/O) completion, synchronization, runtime entry/exit notification, or garbage collection (GC) functionality by one or more execution environment abstractions; and wherein the computer-program instructions for calling further comprise instructions for:

allocating memory, by the CLR via at least one specific interface or object implemented by the host application;

notifying the CLR when a task has been moved to or from a runnable state;

obtaining additional information during process execution; and receiving a list of host abstraction interfaces that correspond to abstracted functionality.

22. The computer-readable storage medium recited in claim 21, wherein the computer-program instructions for determining further comprise instructions for communicating, by the CLR an interface identifier (IID) to the host application, the IID corresponding to an abstraction specific interface.

23. The computer-readable storage medium recited in claim 21, wherein the computer-program instructions for calling further comprise instructions for communicating, by the CLR, a low memory notification from the operating system (OS) to the host application via the at least one specific interface or object.

24. The computer-readable storage medium recited in claim 21, wherein the computer-program instructions for calling further comprise instructions for informing, by the CLR, the host application of consequences of failing a particular memory allocation via the at least one specific interface or object, and thereby allowing the host application to customize an action the CLR should take if a memory allocation must be failed.

25. The computer-readable storage medium recited in claim 21, wherein the computer-program instructions for calling further comprise instructions for creating, by the CLR, a new thread/task via the at least one specific interface or object implemented by the host application.

26. The computer-readable storage medium recited in claim 21, wherein the computer-program instructions for calling further comprise instructions for reusing or pooling, by the CLR, a runtime-implemented portion of a task via the at least one specific interface or object implemented by the host application.

27. The computer-readable storage medium recited in claim 21, wherein the computer-program instructions for calling further comprise instructions for notifying the host application, by the CLR via the at least one specific interface or object or pooling, that a task cannot be moved to a different physical operating system (OS) thread and cannot have execution of the task blocked for a specified window of time.

28. The computer-readable storage medium recited in claim 21, wherein the computer-program instructions for calling further comprise instructions for:

indicating, by the CLR via the at least one specific object or interface, a callback to the host application for notifying the CLR when a task has been moved to a runnable or non-runnable state; and if the task has been moved to a non-runnable state, specifying by the CLR via the at least one specific interface or object that the task is to be rescheduled as soon as possible by the host application.

29. The computer-readable storage medium recited in claim 21, wherein the computer-program instructions for calling further comprise instructions for providing a callback to the host application for notifying the CLR that a task has been moved to a different locale.

30. The computer-readable storage medium recited in claim 21, wherein the computer-program instructions for calling further comprise instructions for notifying, by the CLR via the at least one specific interface or object, the host application, that a task has been moved to a different locale.

31. The computer-readable storage medium recited in claim 21, wherein the computer-program instructions for calling further comprise instructions for delaying, by the CLR, host application abort of a task via the at least one specific interface or object.

32. The computer-readable storage medium recited in claim 21, wherein the computer-program instructions for calling further comprise instructions for adjusting, by the CLR via the at least one specific interface or object, priority of a task.

33. The computer-readable storage medium recited in claim 21, wherein the computer-program instructions for calling further comprise instructions for notifying the host application by the CLR via the at least one specific interface or object that a task/thread is to leave the CLR into unmanaged code.

34. The computer-readable storage medium recited in claim 21, wherein the computer-program instructions for calling further comprise instructions for notifying the host application by the CLR via the at least one specific interface or object that a task/thread is to reverse-leave the CLR into unmanaged code.

35. The computer-readable storage medium recited in claim 21, wherein the computer-program instructions for calling further comprise instructions for notifying the host application by the CLR via the at least one specific interface or object that a task/thread is to enter the CLR from unmanaged code.

36. The computer-readable storage medium recited in claim 21, wherein the computer-program instructions for calling further comprise instructions for notifying the host application by the CLR via the at least one specific interface or object that a task/thread is to reverse-enter the CLR from unmanaged code.

37. The computer-readable storage medium recited in claim 21, wherein the computer-program instructions for calling further comprise instructions for specifying by the CLR via the at least one specific interface or object a maximum number of threads/tasks that will be available to service requests on one or more I/O completion ports.

38. The computer-readable storage medium recited in claim 21, wherein the computer-program instructions for calling further comprise instructions for binding, by the CLR via the at least one specific interface or object, a handle to an I/O completion port or the host application.

39. The computer-readable storage medium recited in claim 21, wherein the computer-program instructions for calling further comprise instructions for supplying a runtime implemented callback to the host application, the runtime implemented callback to be invoked by the host application when an asynchronous I/O operation completes.

40. The computer-readable storage medium recited in claim 21, wherein the computer-program instructions for calling further comprise instructions for:

supplying a runtime implemented callback to the host application, the runtime implemented callback to be invoked by the host application when an asynchronous I/O operation completes; and wherein supplying allows the host application to insert custom data at the end of a structure passed by the host application to the runtime implemented callback, the custom data providing state information.

41. The computer-readable storage medium recited in claim 21:

wherein the computer-program instructions for calling further comprise instructions for generating a task via the at least one specific interface or object; and wherein the computer-program instructions farther comprise instructions for creating, by the CLR via the at least one specific object or interface, one or more synchronization objects for the task to substantially ensure host application knowledge of a lock on the task, the one or more synchronization objects comprising at least one of a critical section, a manual or auto-reset event, a semaphore, a reader/writer lock, or a task monitor.

42. The computer-readable storage medium recited in claim 21, further comprising computer-program instructions for notifying the host application, by the CLR, of one or more runtime interfaces exposed by the CLR, the runtime interfaces allowing the host to notify the CLR of certain events or to obtain additional information at during process execution.

43. A computing device for enhanced runtime hosting, the computing device comprising:

a processor;

a memory coupled to the processor, the memory comprising computer-program instructions executable by the processor, the computer-program instructions for:

extending a functionality of conventional interfaces between runtimes and host applications by allowing a host application to customize and to control many aspects of a runtime;

implementing the runtime as a common language (CLR) at the host application, wherein the host application supplies at least one of threading, memory, or synchronization support used by the CLR;

identifying one or more host abstraction interfaces (HAIs) exposed by a host application, the one or more HAIs corresponding to respective execution environment abstraction(s) supported by the host application;

during execution of runtime managed code and responsive to an action or event associated with an identified one of the respective execution environment abstractions, calling by the CLR, at least one interface or object corresponding to a specific one of the one or more HAIs;

wherein the operations of identifying and calling provide the host application customizable runtime hosting environment to the host application;

wherein one or more execution environment abstractions correspond to at least one of management services for memory, threads/tasks, I/O completion, synchronization, runtime entry/exit notification, or garbage collection (GC) functionality; and wherein the computer-program instructions for calling further comprise instructions for:

allocating memory, by the CLR via at least one specific interface or object implemented by the host application;

notifying the CLR when a task has been moved to or from a runnable state;

obtaining additional information during process execution; and receiving a list of host abstraction interfaces that correspond to abstracted functionality.

44. The computing device as recited in claim 43, wherein the computer-program instructions for calling farther comprise instructions for informing, by the CLR, the host application of consequences of failing a particular memory allocation via the at least one specific interface or object, and thereby allowing the host application to customize an action the CLR should take if a memory allocation must be failed.

45. The computing device as recited in claim 43, wherein the computer-program instructions for calling farther comprise instructions for creating, by the CLR, a new thread/task via the at least one specific interface or object implemented by the host application.

46. The computing device as recited in claim 43, wherein the computer-program instructions for calling farther comprise instructions for reusing or pooling, by the CLR, a runtirne-implemented portion of a task via the at least one specific interface or object implemented by the host application.

47. The computing device as recited in claim 43, wherein the computer-program instructions for calling further comprise instructions for notifying the host application, by the CLR via the at least one specific interface or object or pooling, that a task cannot be moved to a different physical operating system (OS) thread and cannot have execution of the task blocked for a specified window of time.

48. The computing device as recited in claim 43, wherein the computer-program instructions for calling further comprise instructions for:

delaying, by the CLR, host application abort of a task via the at least one specific interface or object; and adjusting, by the CLR via the at least one specific interface or object, priority of a task.

49. The computing device as recited in claim 43, wherein the computer-program instructions for calling further comprise instructions for:

notifying the host application by the CLR via the at least one specific interface or object that a task/thread is to leave the CLR into unmanaged code; and notifying the host application by the CLR via the at least one specific interface or object that a task/thread is to reverse-leave the CLR into unmanaged code.

50. The computing device as recited in claim 43, wherein the computer-program instructions for calling further comprise instructions for:

notifying the host application by the CLR via the at least one specific interface or object that a task/thread is to enter the CLR from unmanaged code; and notifying the host application by the CLR via the at least one specific interface or object that a task/thread is to reverse-enter the CLR from unmanaged code.

51. The computing device as recited in claim 43, wherein the computer-program instructions for calling further comprise instructions for:

binding, by the CLR via the at least one specific interface or object, a handle to an I/O completion port or the host application; and specifying by the CLR via the at least one specific interface or object a maximum number of threads/tasks that will be available to service requests on one or more I/O completion ports.

52. The computing device as recited in claim 43, wherein the computer-program instructions for calling further comprise instructions for:

supplying a runtime implemented callback to the host application, the runtime implemented callback to be invoked by the host application when an asynchronous I/O operation completes; and wherein the instructions for supplying allow the host application to insert custom data at the end of a structure passed by the host application to the runtime implemented callback, the custom data providing state information.

53. The computing device as recited in claim 43, wherein the computer-program instructions for calling further comprise instructions for generating a task via the at least one specific interface or object, and wherein the method further comprises creating, by the CLR via the at least one specific object or interface, one or more synchronization objects for task to substantially ensure host application knowledge of a lock of an operating system (OS) thread, the one or more synchronization objects comprising a critical section, a manual or auto-reset event, a semaphore, a reader/writer lock, or a task monitor.

54. A computer-readable storage medium encoded with a software architecture for enhanced runtime hosting, the computer-readable storage medium encoded with the software architecture comprising:

an application; and a runtime, the application being configured to host the runtime as a common language runtime (CLR);

wherein the CLR exposes a runtime application program interface (RI), the RI allowing the application to indicate a host abstraction interface (HAI) to the CLR, the HAI identifying application abstracted execution environment functionality;

wherein the CLR is further configured to direct actions or events during process execution back to the application for implementation of the application abstracted execution environment functionality via one or more portions of the HAI; and wherein one or more execution environment abstractions correspond to at least one of management services for memory, threads/tasks, input output (I/O) completion, synchronization, runtime entry/exit notification, or garbage collection (GC);

wherein the CLR is further configured to obtain additional information during process execution;

wherein the CLR receives a list of host abstraction interfaces that correspond to abstracted functionality.

55. The method as recited in claim 1, wherein calling further comprises:

queuing, by the CLR via the at least one specific interface or object, a thread/task to a host application implemented thread pool;

setting, by the CLR via the at least one specific interface or object, a size of the host application implemented thread pool; or querying, by the CLR, the host application implemented thread pool via the at least one specific interface or object.

56. The computer-readable storage medium recited in claim 21, wherein the computer-program instructions for calling further comprise instructions for:

queuing, by the CLR via the at least one specific interface or object, a thread/task to a host application implemented thread pool;

setting, by the CLR via the at least one specific interface or object, a size of the host application implemented thread pool; or querying, by the CLR, the host application implemented thread pool via the at least one specific interface or object.

57. The computing device as recited in claim 43, wherein the computer-program instructions for calling further comprise instructions for:

queuing, by the CLR via the at least one specific interface or object, a thread/task to a host application implemented thread pool;

setting, by the CLR via the at least one specific interface or object, a size of the host application implemented thread pool; or querying, by the CLR, the host application implemented thread pool via the at least one specific interface or object.

* * * * *